Oct. 18, 1949.   O. R. SIEMS   2,485,416
RAT AND MOUSE TRAP
Filed April 25, 1945   2 Sheets—Sheet 1
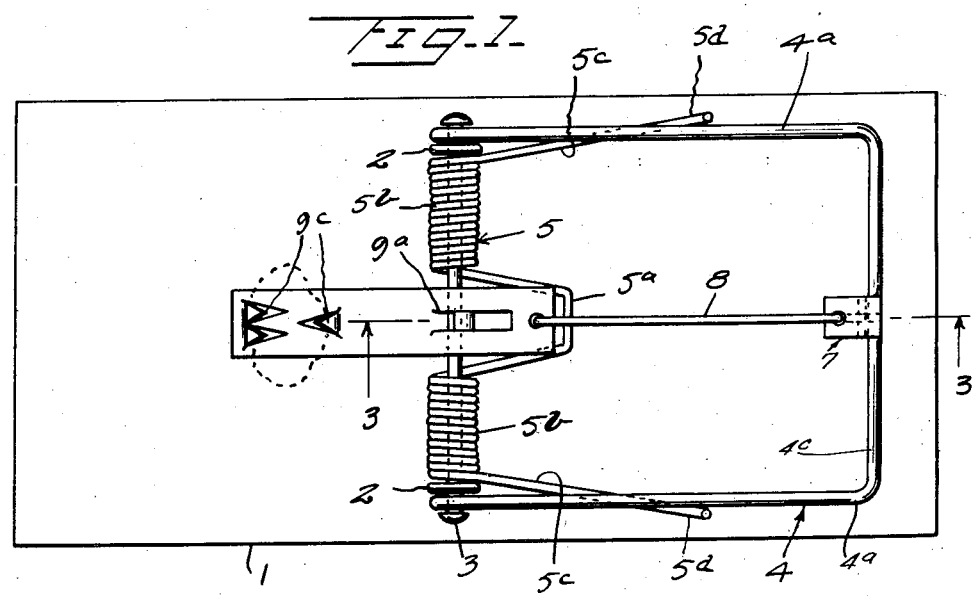
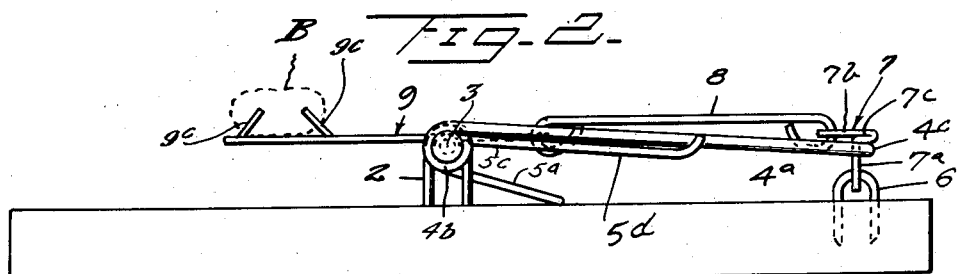
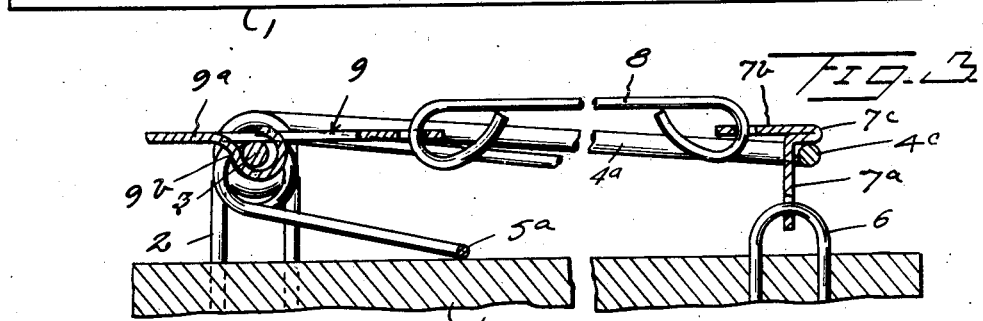
Inventor
O. R. Siems
By Randolph & Beavers
Attorneys Oct. 18, 1949.     O. R. SIEMS     2,485,416
RAT AND MOUSE TRAP
Filed April 25, 1945     2 Sheets-Sheet 2
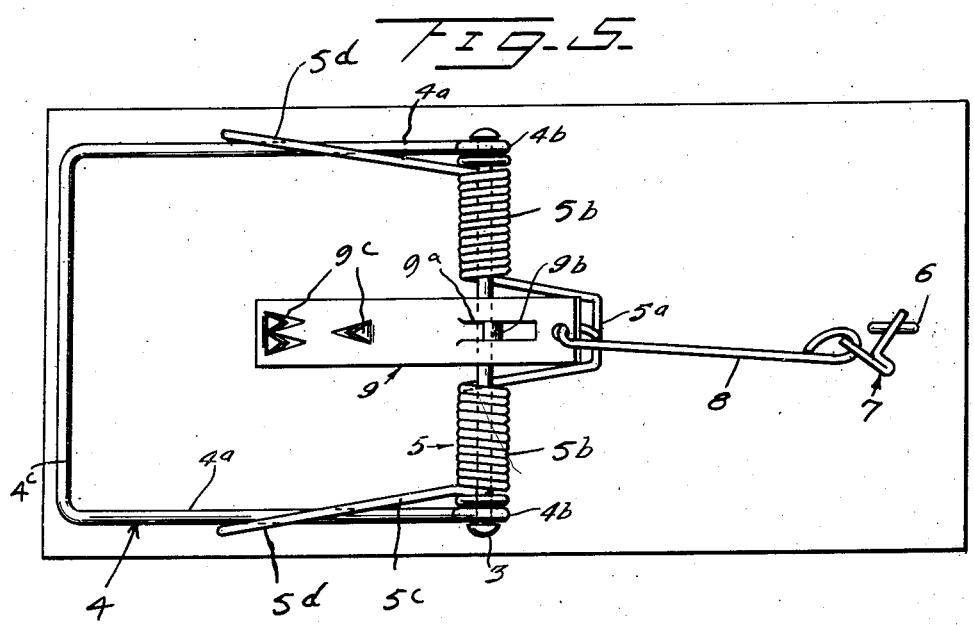
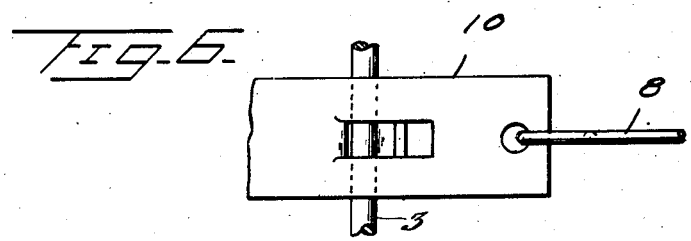
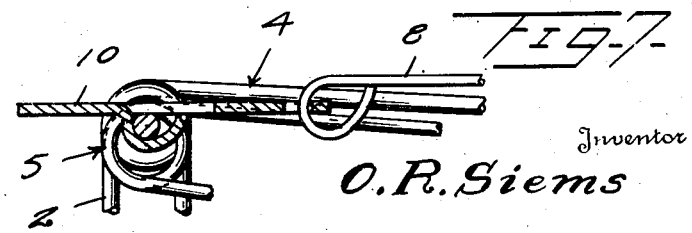
Inventor
O. R. Siems Patented Oct. 18, 1949

2,485,416

UNITED STATES PATENT OFFICE 2,485,416

RAT AND MOUSE TRAP

Otto R. Siems, Yoakum, Tex.

Application April 25, 1945, Serial No. 590,159

1 Claim. (Cl. 43—82)

My invention relates to a trap for rats or other rodents which is of relatively simple and sturdy construction and may be manufactured at low cost.

The main object of the invention is the provision of a trap that the user may set safely i. e., without having his finger caught and crushed as outlined below in the description of the setting of the trap.

A slight movement of the bait pedal will release a trigger from the jaw, which urged by a strong spring, swings toward the other side of the base to clutch the rodent.

Figure 1 is a top plan view of the set trap;

Figure 2 is an elevation of the set trap;

Figure 3 is a fragmentary longitudinal, vertical enlarged section on line 3—3 of Figure 1 through some of the movable parts;

Figure 4 is an enlarged detail top plan view of the pivot portion of the bait pedal;

Figure 5 is a top plan view of the trap in inoperative position;

Figure 6 is a detail top plan view of a modified pivot portion of the bait pedal; and Figure 7 is a longitudinal section of such modification.

An oblong base 1 of wood or other suitable material has embedded therein a pair of aligned spaced staples 2, thus presenting a pair of aligned openings somewhat nearer to the left hand end than to the right hand end of the base 1. A pin 3 headed at both ends is lodged in the openings and passes through eyes 4b formed upon the ends of parallel legs 4a, of a jaw 4, having a crossbar 4c. A spring structure 5 of resilient stock comprises an intermediate U-shaped portion 5a, bearing against the top surface of the base, coiled aligned portions 5b forming angular extensions of the legs of the U, and having axes parallel to the crossbar of the U portion, and arms 5c extending substantially parallel to a leg 4a and secured thereto by bent ends 5d. The spring structure urges the jaw to the position shown in Figure 5. A staple 6 is embedded in the base and near the right hand end thereof. The curved portion of the staple passes through an aperture formed in the lower end of the vertical leg 7a of a trigger 7, having also a crossbar consisting of a horizontal leg 7b with an aperture therein and leg 7c forming a straight extension of 7b. To insure economy of manufacture of the trigger it is proposed to make the same of sheet metal as shown best in Figures 1, 3, or of stiff wire. The aperture in leg 7b is linked with one of the ears of rod 8 extending forwardly, and the said rod having another ear linked with an aperture in the end of the bait pedal 9. The latter has at its intermediate portion 9a a pivot construction formed by striking out a tongue 9b and bending the same into part of a circle (Figure 3) surrounding the intermediate portion of pin 3 between the coiled portions of the spring structure 5. The bait B is held by the sharp points of three triangular tongues 9c struck out of the rear end of the bait pedal, two of which tongues point rearwardly and one points forwardly between the other tongues.

In Figures 6 and 7 the pivot portion of the bait pedal 10 is modified by bending the tongue struck out from the pedal so that its free end does not extend above the bottom surface of the pedal.

To use the baited trap the user places two fingers of his left hand against the rear or right hand end of the base and the left thumb against the front or left hand end of the base. Two fingers of the right hand are used to force the jaw towards the rear end where the former is held against the base between the fingers of the right hand and the right thumb. For ease of manipulation the left hand should take the place of the right hand in holding the jaw down against the base so that two fingers of the right hand can place the trigger in upright position shown in Figure 3 and force the leg 7c over the cross bar 4c of the jaw whereby a slight pull is exerted upon rod 8 and the bait pedal. With trap in set position a slight movement of the baited end of the pedal by the rodent will spring the trap.

Further, the trigger portion 7c which engages the outer portion 4c of the jaw, acts as a safety factor, preventing any likelihood of the operator's hand being caught accidentally, since jaw part 4c can be held set while trigger 7 is swung to position its part 7c over part 4c.

While the foregoing description sets forth the invention in specific terms, it is to be understood that numerous changes in the shape, size and materials may be resorted to without departing from the spirit and scope of the invention as claimed hereinafter.

What I claim and desire to secure by Letters Patent is:

In an animal trap, an oblong base, a pair of spaced staples embedded in the base with their openings aligned in a line substantially central of and transverse to the base, a pin headed at both ends lodged in the staple openings, a U-shaped jaw having ears encircling the pin formed upon the free ends of its legs and having a crossbar, a spring structure comprising a bight portion bearing against the base, coiled portions surrounding the pin having arms extending from the outer ends of the coils and engaging with their free ends the legs of the jaw, a staple embedded in the base near one end thereof with its plane lying in the substantial longitudinal center line of the base, a T-shaped trigger pivoted by its vertical leg to the staple, a rod pivoted at one end to the end of the horizontal portion of the T remote from the nearest end of the base, and a bait pedal pivoted at an intermediate point upon the pin and at one end to the opposite end of the rod and having bait holding means upon its opposite free end.

OTTO R. SIEMS.

REFERENCES CITED

The following references are of record in the file of this patent:

UNITED STATES PATENTS

| Number | Name | Date |
| --- | --- | --- |
| 712,182 | Cox | Oct. 28, 1902 |
| 1,342,098 | Carson | June 1, 1920 |
| 2,146,361 | Stilson | Feb. 7, 1939 |

FOREIGN PATENTS

| Number | Country | Date |
| --- | --- | --- |
| 42,307 | Sweden | Nov. 17, 1915 |
| 465,991 | Great Britain | May 20, 1937 |